UNITED STATES PATENT OFFICE.

GEORGE E. FERGUSON, OF NEW YORK, N. Y., ASSIGNOR TO PYRENE MANUFACTURING COMPANY, A CORPORATION OF DELAWARE.

FIRE-EXTINGUISHING AND FIREPROOFING COMPOSITION.

1,276,742.     Specification of Letters Patent.     Patented Aug. 27, 1918.

No Drawing.     Application filed December 12, 1914.     Serial No. 876,814.

*To all whom it may concern:*

Be it known that I, GEORGE E. FERGUSON, a citizen of the United States, and resident of the city, county, and State of New York, have invented certain new and useful Improvements in Fire-Extinguishing and Fireproofing Compositions, of which the following is a specification.

The object of this invention is to produce a fire extinguishing liquid from certain water soluble salts and, at the same time, fireproof the burning material to prevent its catching fire again, due to any burning embers in the immediate proximity or otherwise.

Other objects are to provide a liquid which has a low freezing point, is cheap to manufacture and which is expelled from the extinguisher by the generation of a gas, such as by the action of an acid on a carbonate or bicarbonate.

After a long series of experiments, it was found that all of these features and results were obtained in a liquid having the following salts dissolved therein: potassium carbonate ($K_2CO_3$), sodium phosphate ($Na_3PO_4 12H_2O$) and borax ($Na_2B_4O_7 10H_2O$). The acid for expelling this mixture is preferably muriatic or hydrochloric acid, with a small amount of glycerin added.

Considering first the freezing point; it is well known that salts of inorganic substances commonly known as "electrolytes" will depress the freezing point of water. The extent of this depression depends upon the amount of salt dissolved. It is obvious, therefore, that could a very soluble salt be used which would, at the same time, have fire extinguishing and fireproofing qualities, the result would be ideal. I have found that a salt which accomplished this is potassium carbonate ($K_2CO_3$). At zero degrees centigrade, 89.4 parts of potassium carbonate are soluble in 100 parts of water, and the resulting solution will not freeze until it reaches a temperature of $-35°$ C. to $-38°$ C. This salt, potassium carbonate, also contains the carbon dioxid which is made use of as the expelling force in the operation of the extinguisher.

In this liquid or solution, 25 parts of trisodium phosphate ($Na_3PO_4 12H_2O$) can be dissolved, which lowers the freezing point to $-38°$ C. to $-40°$ C. Not only is it necessary to add a fireproofing agent, such as a phosphate for fireproofing qualities, but the "ions" of "$CO_3$" and "K" (carbonate and potassium) must not again be introduced into the solution or precipitation will take place, resulting in clogging the extinguisher, etc.

It has also been found advisable to add 2.5 parts of tetra sodium borate ($Na_2B_4O_7 10H_2O$), on account of its fireproofing and fire extinguishing qualities.

The phosphate which I add is more soluble in a solution of potassium carbonate than in plain water; the presence of the alkali carbonate salt facilitating solution.

The acid used to generate the gas which expels the contents of the extinguisher is commercial hydrochloric or muriatic acid which, with the addition of a small amount of glycerin, will not freeze until it reaches a temperature below $-50°$ C.

When this acid acts on the potassium carbonate carbon dioxid gas is evolved, and potassium chlorid is formed. The salt thus formed, potassium chlorid (KCl) is also an excellent fireproofing as well as an efficient fire extinguishing compound.

A number of results are produced in one liquid when acted upon by a reagent or acid as follows:

The liquid is expelled from the extinguisher by the generation of a gas; the liquid is composed of water soluble salts, it has a low freezing point, it is very efficient for extinguishing fires, and for fireproofing the material and is cheaply made.

The following steps show the process of determining the elements of the compound to produce these results:

If the liquid is to be expelled by the action of a reagent or acid thereupon to produce a gas it must contain either a carbonate or a bicarbonate which is soluble in water. There are other chemical actions, such as the action of an acid on a sulfite where sulfur dioxid gas is generated or on a cyanid where prussic acid gas is produced or upon hypochlorite where chlorin gas is generated, all of which could be made use of to expel the contents of the extinguisher, but the gases in each case, outside of the carbon dioxid gas, are poisonous and, therefore, must be eliminated as practically useless.

We have then to consider only carbon dioxid gas. While the action of any common acid on any carbonate or bicarbonate will generate the carbon dioxid gas and at the same time form the salt of the acid used in connection with the metal (or group of elements acting like a metal) which were originally combined with the carbonate radical, we must limit ourselves to soluble salts in making up this solution. This limitation gives us three carbonates and three bicarbonates to choose from: sodium carbonate, sodium bicarbonate, potassium carbonate, potassium bicarbonate, ammonium carbonate, ammonium bicarbonate. Of these six salts we can eliminate ammonium carbonate and bicarbonate because of the fact that they evolve ammonia which is detrimental to the metal container. This leaves us only the potassium and sodium salts, either of which can be used with equal efficiency in evolving carbon dioxid gas.

The determination of which one to use lies with another feature of the liquid; a low freezing point. From well known experimental determinations, Vant Hoff's law for the depression of the freezing point of solutions can be aptly applied in this case. The amount that the freezing point can be depressed can be determined by noting the solubility of the compound in water, which depends upon its weight and the temperature at which it is dissolved. The following table gives the solubilities for the four before mentioned salts:

|  | Molecular weight. | Solubility. | Temperature. |
| --- | --- | --- | --- |
| Sodium carbonate | 106 | 7.1 | 0° C. |
| Sodium bicarbonate | 84 | 6.9 | 0° C. |
| Potassium carbonate | 138 | 89.4 | 0° C. |
| Potassium bicarbonate | 100 | 22.4 | 0° C. |

(These figures are comparable directly and the solubility factor means the weight of the salt soluble in 100 parts of pure water by weight.)

It is noted that the potassium carbonate gives the most satisfactory result.

For these two reasons, therefore, we prefer to use potassium carbonate as the energy producing salt and which has the most pronounced effect on the freezing point.

Another very excellent point about potassium carbonate is that it is not easily decomposed by heat; (requiring a temperature of 898° C. to melt it; its decomposition point is very much higher.) Contrasting this property with the carbonate and bicarbonate of sodium and the bicarbonate of potassium we find the following:

|  | Melting point. | Decomposition point. |
| --- | --- | --- |
| Potassium bicarbonate | 100° to 150° C. | Not given. |
| Sodium carbonate | 849° C. | Not given. |
| Sodium bicarbonate | 270° C. | 270° C. |

From this it will be noted, that the potassium carbonate is, in itself, a good fireproofing substance.

The efficiency of water, as a fire extinguishing agent, is greatly increased by the addition of non-inflammable soluble salts. Potassium carbonate in water will fireproof to a certain extent, but it is desirable to add some substance which will impart greater resistance to the flame.

In this case, as has been cited above, it is necessary to add a soluble substance, but, more than this, it is necessary to add a substance which will not react in any way with the carbonate already dissolved. This prevents the use of a potassium salt or acid. The reason is that the potassium carbonate is present in a degree approximating saturation, therefore the water has taken up nearly as much potassium and carbonate "ions" as it can hold and the introduction of any more of these "ions" will cause potassium carbonate to be thrown out of the solution, which must be avoided.

Ammonium salts are prohibited for the reason before mentioned. Any carbonate other than sodium, potassium or ammonium cannot be used because of their insolubility in water. This prohibits the use of any other salt than sodium or potassium, as the addition of any other salt having a different metal than sodium will form an insoluble carbonate as soon as it is introduced.

Sodium salts are all that are left for consideration and probably the sodium salt to give the best fireproofing effect is the phosphate. There are five phosphates of sodium, which are given below with certain of their properties:

|  | Formula. | Molecular weight. | Solubility in 100 parts $H_2O$. |
| --- | --- | --- | --- |
| Trisodium phosphate | $Na_3PO_4 12H_2O$ | 380 | 28.3 |
| Di-sodium phosphate | $Na_2HPO_4 12H_2O$ | 358 | 6.3 |
| Monosodium phosphate | $NaH_2PO_4 H_2O$ | 138 | Very soluble. |
| Sodium pyrophosphate | $Na_4P_2O_7 10H_2O$ | 446 | 5.4 |
| Sodium metaphosphate | $Na_4P_4O_{12}$ | 408 | Insoluble. |

Considering the solubility of these salts in a solution of potassium carbonate in water, we must eliminate the di-sodium phosphate and the mono-sodium phosphate, because they react with the potassium carbonate, being acid salts. This leaves the sodium pyrophosphate and the tri-sodium phosphate (the sodium metaphosphate being insoluble). Of these two there is the solubility to consider, and this point leaves the choice with the trisodium phosphate. This salt also has a slight depressing effect on the freezing point and is slightly more soluble in the presence of potassium carbonate than in pure water, although the salt is not added to its greatest degree of saturation, room being left in the solution for another sodium salt.

Borax, or sodium tetra borate ($Na_2B_4O_7$ $10H_2O$), has a number of distinctly interesting features as a fireproofing compound. When this salt is heated it froths up and increases four or five times its volume and finally melts into a glassy mass of highly refractive properties, commonly known as "borax glass." This salt (borax) is not very soluble in water, only 2.83 parts dissolving in 100 parts of water at 0° C. (by weight).

We have used 2.5 parts of borax in the compound above mentioned. For this reason the trisodium phosphate was not dissolved to the point of saturation, otherwise the salt would be thrown down when the borax was added, due to the increase in sodium "ions." The addition of the borax has practically no noticeable effect on the freezing point.

The acid used in the ordinary soda and acid extinguisher to react on the bicarbonate of soda, thereby producing the pressure upon liberation of the carbon dioxid, is sulfuric acid. We cannot use this acid with the present compound because when sulfuric acid reacts with potassium carbonate, although carbon dioxid is produced just as freely and easily as in the case of its action upon the bicarbonate of soda, the salt which is formed simultaneously with the carbon dioxid namely, potassium sulfate, is not sufficiently soluble in water, (only 8.5 parts dissolving in 100 parts of water, by weight) to keep it in solution; the result being a precipitation of, or a throwing down of potassium sulfate. Instead, therefore, of using this acid we find that muriatic or hydrochloric acid will accomplish the same result, so far as the formation of carbon dioxid is concerned, and, at the same time, give a salt, potassium chlorid, which is nearly four times as soluble. (28.5 parts of potassium chlorid dissolving 100 parts of water at 0° C., by weight).

Potassium chlorid is also an excellent fireproofing salt, as it does not decompose even at white heat; so that the use of hydrochloric acid really increases the fireproofing efficiency of the compound.

The muriatic or hydrochloric acid, when treated with a small amount of glycerin, will not freeze until it reaches a temperature of below —50° C., which feature is very important.

Another acid which could be used is acetic acid, which produces carbon dioxid as readily as hydrochloric acid, and which forms potassium acetate, an extremely soluble salt (188 parts of potassium acetate dissolves in 100 parts of water at 2° C., by weight.) The freezing point of acetic acid is —17° C. but this can be readily lowered by the addition of acetone or glycerin, or both together, and in such quantities, as to produce little effect on the fire extinguishing properties of the liquid. Acetic acid, however, is quite expensive and, therefore, muriatic acid is the choice.

Another feature, not before mentioned, is the fact that the solution of these compounds is so nearly saturated that the fire has only to act upon it a short time before these fireproofing salts are thrown down, due to the fact that the solvent, (water) is driven off in the form of steam, so that simultaneously with the extinguishing of the fire the wood is fireproofed and prevented from becoming reignited.

While I believe a solution containing all of the compounds above enumerated is to be preferred, from the commercial and scientific standpoint, I do not wish to be understood as limiting this invention to a compound containing necessarily all of the compounds or the specific compounds named, as it will be obvious that a number of solutions may be formed from one or more of the compounds named, or their equivalents, from the chemical standpoint, which would be efficient for the purposes set out.

What I claim is:

1. A fireproofing and fire extinguishing composition comprising a substantially saturated aqueous solution of potassium carbonate and borax, and sufficient sodium phosphate to substantially saturate the solution.

2. A fireproofing and fire extinguishing composition comprising an aqueous solution of potassium carbonate, a phosphate of sodium and borax.

3. A fireproofing and fire extinguishing composition comprising an aqueous solution of potassium carbonate, trisodium phosphate and borax.

Signed at the city, county, and State of New York, this 25th day of November, 1914.

GEORGE E. FERGUSON.

Witnesses:
 LEWIS J. DOOLITTLE,
 HAROLD W. CHAPMAN.